(12) United States Patent
Gorny et al.

(10) Patent No.: US 6,740,693 B1
(45) Date of Patent: May 25, 2004

(54) POLYCARBONATE MOULDING COMPOUNDS

(75) Inventors: Rüdiger Gorny, Krefeld (DE); Siegfried Anders, Köln (DE); Wolfgang Nising, St. Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 54 days.

(21) Appl. No.: 10/129,767

(22) PCT Filed: Oct. 30, 2000

(86) PCT No.: PCT/EP00/10656
§ 371 (c)(1),
(2), (4) Date: May 8, 2002

(87) PCT Pub. No.: WO01/34691
PCT Pub. Date: May 17, 2001

(30) Foreign Application Priority Data

Nov. 11, 1999 (DE) .......................... 199 54 313

(51) Int. Cl.⁷ .................. C08L 69/00; C08K 5/3475
(52) U.S. Cl. .................. 524/91; 524/100; 524/151; 524/154; 524/208; 524/311; 524/312; 524/313; 428/412; 554/122
(58) Field of Search ................. 428/512, 412; 554/122; 524/91, 100, 151, 154, 208, 311, 312, 313

(56) References Cited

U.S. PATENT DOCUMENTS

| | | | |
|---|---|---|---|
| 4,097,435 A | 6/1978 | Rawlings et al. | 260/28 R |
| 4,845,193 A | 7/1989 | Umemura et al. | 528/502 |
| 5,055,508 A | * 10/1991 | Ohtsubo | 524/128 |
| 5,108,835 A | 4/1992 | Hähnsen et al. | 428/334 |
| 5,856,012 A | 1/1999 | Kühling et al. | 428/412 |

FOREIGN PATENT DOCUMENTS

| | | |
|---|---|---|
| EP | 0 110 221 | 4/1987 |
| WO | 96/06135 | 2/1996 |
| WO | 99/05205 | 2/1999 |

OTHER PUBLICATIONS

Clariant Brochure, "Licowax, Licolub, Licomont", Dec. 2000; pp. 1–19.*

**Database Chemical Abstract Online! chemical abstracts service Columbus, Ohio, US; Uemura et al: retrieved from STN Database accession No. 130:238558, XP002161554 abstract & JP 11 080387 A, Mar. 26, 1999.

* cited by examiner

Primary Examiner—David J. Buttner
(74) Attorney, Agent, or Firm—Joseph C. Gil; Aron Preis

(57) ABSTRACT

A Polycarbonate molding composition is disclosed. The composition that contains a compound conforming to the general formula (I)

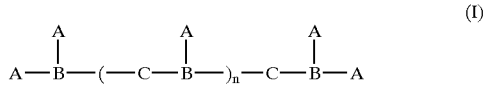

wherein A represents a $C_{10}$ to $C_{40}$-fatty acid radical, B represents a trivalent alcohol having 3 to 20 carbon atoms, C represents a dicarboxylic acid radical having 4 to 40 carbon atoms, and n represents an integer from 0 to 15, is suitable for making a variety of molded articles having surface of good quality.

16 Claims, No Drawings

POLYCARBONATE MOULDING COMPOUNDS

The invention relates to polycarbonate moulding compositions and objects, in particular sheets, produced partly or completely from these moulding compositions.

Polycarbonate sheets are known, for example, from EP-A 0 110 221 and are provided for a large number of intended uses. They are produced by extrusion of polycarbonate moulding compositions and optionally coextrusion with polycarbonate moulding compositions which comprise an increased content of UV absorbers.

An ever recurring problem in the extrusion of such sheets is the deposition of volatile constituents from the moulding composition on the calibrator (in the case of spaced sheets) or on the rolls (in the case of massive sheets), which can cause surface defects. Volatile constituents are, for example, UV absorbers, mould release agents and other low-volatility secondary constituents.

EP-A 0 320 632 describes coextruded sheets of polycarbonates which comprise a UV absorber and can comprise a lubricant. A disadvantage is that during the relatively long extrusion time the surface of the sheets is adversely influenced by evaporations from the polycarbonate melt, especially in the case of coextrusion. Increased evaporation of the UV absorber out of the polycarbonate melt leads to the formation of a deposit on the calibrator or the rolls and finally to the formation of defects in the sheet surface, for example white specks and waviness. Furthermore, the abraded polycarbonate on the calibrator can cause pulverulent deposits on the coextruded polycarbonate sheets.

EP-A 0 649 724 describes a process for the production of multilayered slabs of plastic from branched polycarbonates with molecular weights $\overline{M}_w$ of 27,000 to 29,500 by coextrusion of a core layer and at least one top layer with 1 to 15 wt. % of a UV absorber. If the mould release agents described in EP-A 0 300 485, glycerol monostearate, pentaerythritol tetrastearate and mixtures thereof with glycerol monostearate, are employed as main components in the moulding compositions for the production of these slabs of plastic, a deterioration in the surfaces of the sheets nevertheless occurs in time.

The invention is thus based on the object of optimizing polycarbonate moulding compositions for sheet production to the extent that the good quality of the surface of the extruded polycarbonate sheets can be retained even during a relatively long continuous operation.

This object is achieved by polycarbonate moulding compositions which comprise compounds of the general formula (I)

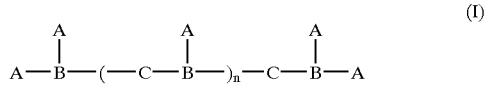

wherein
  A represents a $C_{10}$ to $C_{40}$-fatty acid radical, preferably $C_{22}$ to $C_{34}$-fatty acid radical,
  B represents a radical derived from a trivalent alcohol having 3 to 20, preferably 5 to 10 carbon atoms, particularly preferably the trimethylolpropane radical,
  C represents a dicarboxylic acid radical having 4 to 40, preferably 5 to 10 carbon atoms and
  n represents an integer from 0 to 15.
These compounds are commercially available.

The use of these compounds has proved to be particularly favourable for polycarbonate moulding compositions. They can be processed with polycarbonates without problems and show no impairment in the shaped articles obtained as the product. Surprisingly, it has been found that when these compounds are employed as polycarbonate moulding composition additives which are known to be volatile, they no longer lead to the problems described above.

The concentration of the compounds of the formula (I) to be employed according to the invention in the polycarbonate moulding composition can preferably be 0.02 to 1 wt. %, in particular 0.05 to 0.4 wt. %, based on the weight of the moulding composition.

Thermoplastic aromatic polycarbonates for the moulding compositions according to the invention or the sheets of plastic to be produced therefrom are those which have also been used hitherto for this purpose. These are homopolycarbonates, copolycarbonates and thermoplastic polyester-carbonates. They have average molecular weights $\overline{M}_w$ of 25,000 to 40,000, preferably 26,000 to 36,000, and in particular 28,000 to 35,000, determined by measuring the relative solution viscosity in methylene chloride or in mixtures of equal amounts by weight of phenol/o-dichlorobenzene, calibrated by light scattering.

For the preparation of polycarbonates, reference is made by way of example to "Schnell", Chemistry and Physics of Polycarbonates, Polymer Reviews, vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, vol. 19, 75–90 (1980), to D. Freitag, U. Grigo, P. R. Müller, N. Nouvertne, BAYER AG, "Polycarbonates" in Encyclopaedia of Polymer Science and Engineering, vol. 11, second edition, 1988, pages 648–718 and finally to Dres. U. Grigo, K. Kircher and P. R. Müller "Polycarbonate [Polycarbonates]" in Becker/Braun, Kunststoff-Handbuch [Plastics Handbook], volume 3/1, Polycarbonate, Polyacetale, Polyester, Celluloseeste [Polycarbonates, Polyacetals, Polyesters, Cellulose Esters], Carl Hanser Verlag Munich, Vienna 1992, pages 117–299. The preparation is preferably carried out by the phase boundary process or the melt transesterification process and is described using the phase boundary process by way of example.

Compounds which are preferably to be employed as starting compounds are bisphenols of the general formula HO—Z—OH, wherein Z is a divalent organic radical having 6 to 30 carbon atoms, which contains one or more aromatic groups. Examples of such compounds are bisphenols which belong to the group of dihydroxydiphenyls, bis (hydroxyphenyl)alkanes, indanebisphenols, bis(hydroxyphenyl)ethers, bis(hydroxyphenyl)sulfones, bis (hydroxyphenyl)ketones and α,α'-bis(hydroxyphenyl)-diisopropylbenzenes.

Particularly preferred bisphenols which belong to the abovementioned groups of compounds are bisphenol A, tetraalkylbisphenol A, 4,4-(meta-phenylenediisopropyl)-diphenol (bisphenol M), 4,4-(para-phenylenediisopropyl)-diphenol, 1,1-bis-(4-hydroxyphenyl)-3,3,5-trimethylcyclohexane (BP-TMC) and optionally mixtures thereof. Homopolycarbonates based on bisphenol A and copolycarbonates based on the monomers bisphenol A and 1,1-bis-(4-hydroxyphenyl)-3,3,5-trimethylcyclohexane are particularly preferred. The bisphenol compounds to be employed according to the invention are reacted with carbonic acid compounds, in particular phosgene or, in the melt transesterification process, diphenyl carbonate or dimethyl carbonate.

Polyester-carbonates are obtained by reaction of the bisphenols already mentioned, at least one aromatic dicarboxylic acid and optionally carbonic acid equivalents.

Suitable aromatic dicarboxylic acids are, for example, orthophthalic acid, terephthalic acid, isophthalic acid, 3,3'- or 4,4'-diphenyldicarboxylic acid and benzophenonedicarboxylic acids. Some, up to 80 mol %, preferably 20 to 50 mol %, of the carbonate groups in the polycarbonates can be replaced by aromatic dicarboxylic acid ester groups.

Inert organic solvents used are, for example, methylene chloride, the various dichloroethanes and chloropropane compounds, carbon tetrachloride, chloroform, chlorobenzene and chlorotoluene, and chlorobenzene and methylene chloride or mixtures thereof are preferably employed.

The reaction can be accelerated by catalysts, such as tertiary amines, N-alkylpiperidines or onium salts. Tributylamine, triethylamine and N-ethylpiperidine are preferably used. If the melt transesterification process is used for the preparation of polycarbonates, the catalysts mentioned in DE-A 42 38 123 can be used.

The polycarbonates can be branched deliberately and in a controlled manner by the use of small amounts of branching agents. Suitable branching agents are, for example, phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-4-hydroxyphenyl)-cyclohexyl]propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester, tetra-(4-hydroxyphenyl)-methane; tetra-(4-(4-hydroxyphenyl-isopropyl)-phenoxy)-methane; α,α',α"-tris-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl) benzene and, in particular, 1,1,1-tri-(4-hydroxyphenyl)-ethane and 3,3-bis-(3-methyl-4-hydroxyphenyl)-2-oxo-2,3-dihydroindole. The 0.005 to 2 mol %, based on the diphenols employed, of branching agents or mixtures of branching agents optionally to be co-used can be employed together with the diphenols.

Suitable chain stoppers are, preferably, phenols, such as phenol, alkylphenols, such as cresol and 4-tert-butylphenol, chlorophenol, bromophenol, cumylphenol or mixtures thereof. Phenol, 4-tert-butylphenol or cumylphenol are particularly preferred. Chain stoppers and branching agents can be added to the synthesis as a separate solution or also together with the bisphenolate.

For preparation of the polycarbonates by the phase boundary process, the bisphenols are dissolved in an aqueous alkaline phase, preferably sodium hydroxide solution. The chain stoppers optionally required for the preparation of copolycarbonates are dissolved in the aqueous alkaline phase or added to this in bulk in an inert organic phase in amounts of 1.0 to 20.0 mol% per mol of bisphenol. Phosgene is then passed into the mixer, which contains the other constituents of the reaction, and the polymerization is carried out. After the reaction the organic phase containing the polycarbonate is separated from the aqueous phase and washed several times and the polycarbonate is then isolated. The preparation of polycarbonates by the melt transesterification process is described by way of example in DE 42 38 123.

Suitable UV absorbers which can be employed in the moulding compositions according to the invention are those compounds which, because of their absorption capacity below 400 nm, are capable of protecting polycarbonate effectively from UV light and have a molecular weight of more than 370, preferably of 500 and more. UV absorbers can be contained in the moulding compositions in an amount of 0.1 to 15 wt. %, preferably 3 to 8 wt. %, based on the weight of the moulded sheet.

Suitable UV absorbers are, in particular, the compounds of the formula (II) described in WO 99/05205

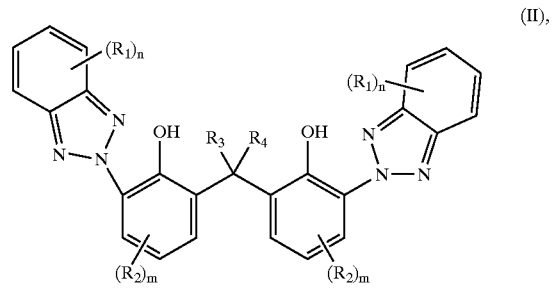

wherein
  $R^1$ and $R^2$ are identical or different and represent H, halogen, $C_1$–$C_{10}$-alkyl, $C_5$–$C_{10}$-cycloalkyl, $C_7$–$C_{13}$-aralkyl, $C_6$–$C_{14}$-aryl, —$OR^5$ or —(CO)—O—$R^5$, where $R^5$=H or $C_1$–$C_4$-alkyl,
  $R^3$ and $R^4$ are also identical or different and represent H, $C_1$–$C_4$-alkyl, $C_5$–$C_6$cycloalkyl, benzyl or $C_{6-C14}$-aryl,
  m is 1, 2 or 3 and
  n is 1, 2, 3 or 4,
and those of the formula (III)

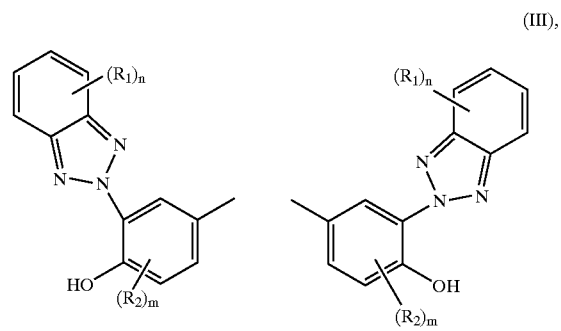

wherein the bridge denotes

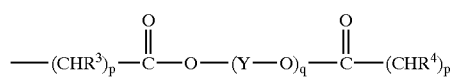

$R^1$, $R^2$, m and n have the meaning given for formula (II), and wherein furthermore p is an integer from 0 to 3,
q is an integer from 1 to 10,
Y is —$CH_2$—$CH_2$—, —$(CH_2)_3$—, —$(CH_2)_4$—, —$(CH_2)_5$—, —$(CH_2)_6$— or $CH(CH_3)$—$CH_2$ and
$R^3$ and $R^4$ have the meaning given for formula (II).

Further suitable UV absorbers are those which are substituted triazines, such as 2,4-bis(2,4-dimethylphenyl)-6-(2-hydroxy-4-n-octyloxyphenyl)-1,3,5-triazine (CYA-SORB® UV-1164) or 2-(4,6-diphenyl-1,3,5-triazin-2-yl)-5-(hexyl)oxyphenyl (Tinuvin® 1577). A particularly preferred UV absorber is 2,2-methylenebis-(4-(1,1,3,3-tetramethylbutyl)-6-(2H-benzotriazol-2-yl)phenol), which is marketed commercially under the name Tinuvin® 360 or Adeka Stabs® LA 31. The UV absorber Uvinul®3030, obtained in accordance with WO 96/15102, example 1, of the formula (IV)

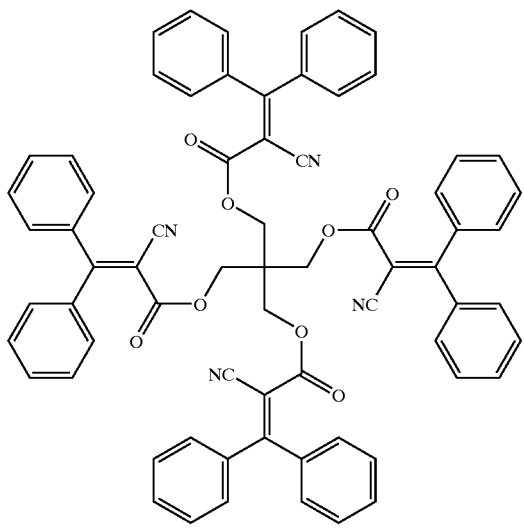

(IV).

is furthermore suitable.

The UV absorbers mentioned in EP-A 0500496 are moreover suitable.

Suitable stabilizers for the polycarbonates are, for example, phosphines, phosphites or Si-containing stabilizers and further compounds described in EP 0 500 496 A1. Examples which may be mentioned are triphenylphosphine, diphenyl alkyl phosphites, phenyl dialkyl phosphites, tris-(nonylphenyl)phosphite, tetrakis-(2,4-di-tert-butylphenyl)4,4'-biphenylene-diphosphonite and triaryl phosphites. Triphenylphosphine and tris-(2,4-di-tert-butylphenyl)phosphite are particularly preferred.

The moulding composition according to the invention can furthermore comprise glycerol mono-fatty acid esters. These are preferably employed in amounts of 0.01 to 1 wt. %, particularly preferably 0.02 to 0.3 wt. %, based on the weight of the moulding composition. Glycerol mono-fatty acid esters are esters of glycerol with saturated aliphatic $C_{10}$ to $C_{26}$-monocarboxylic acids, preferably with saturated aliphatic $C_{14}$ to $C_{22}$-monocarboxylic acids. In the case of the moulding composition according to the invention, the higher volatility thereof no longer causes the problems described above.

Glycerol mono-fatty acid esters are to be understood as both those of the primary OH function of the glycerol and those of the secondary OH function of the glycerol, as well as mixtures of these two isomeric classes of compounds. Due to their preparation, the glycerol mono-fatty acid esters can contain less than 50% of different diesters and triesters of glycerol.

Saturated aliphatic monocarboxylic acids having 10 to 26 C atoms are, for example, capric acid, lauric acid, myristic acid, palmitic acid, stearic acid, arachic acid, behenic acid, lignoceric acid and cerotic acid.

Preferred saturated aliphatic monocarboxylic acids having 14 to 22 C atoms are, for example, myristic acid, palmitic acid, stearic acid, arachic acid and behenic acid.

Particularly preferred saturated aliphatic monocarboxylic acids are palmitic acid and stearic acid.

The saturated aliphatic $C_{10}$–$C_{26}$-carboxylic acids and the glycerol mono-fatty acid esters to be employed according to the invention either are known as such from the literature or can be prepared by processes which are known from the literature (see, for example, Fieser and Fieser, Organische Chemie [Organic Chemistry] GmbH, Weinheim, Bergstr. 1965, chap. 30, page 1206 et seq.). Examples of glycerol mono-fatty acid esters are those of the abovementioned particularly preferred monocarboxylic acids.

Examples of antistatics are cationic compounds, for example quaternary ammonium, phosphonium or sulfonium salts, anionic compounds, for example alkylsulfonates, alkyl sulfates, alkyl phosphates and carboxylates in the form of alkali metal or alkaline earth metal salts, and nonionic compounds, for example polyethylene glycol esters, polyethylene glycol ethers, fatty acid esters and ethoxylated fatty amines. Preferred antistatics are nonionic compounds.

The addition of flameproofing agents, pigments, dyestuffs, finely divided minerals, optical brighteners and other additives to the moulding compositions is furthermore possible.

All the starting substances and solvents use for the synthesis may be contaminated with appropriate impurities from their preparation and storage, the aim being to work with starting substances which are as pure as possible.

The individual constituents can be mixed in a known manner, both successively and simultaneously, and in particular both at room temperature and at elevated temperature.

The additives are incorporated into a moulding composition in a known manner by mixing polymer granules with the additives at temperatures of about 200 to 330° C. in conventional units, such as internal kneaders, single-screw extruders and twin-shaft extruders, for example by melt compounding or melt extrusion, or by mixing the solutions of the polymer with solutions of the additives and subsequently evaporating off the solvents in a known manner. The content of additives in the moulding composition can be varied within wide limits and depends on the desired properties of the moulding composition. The total content of additives in the moulding composition is, for example, up to 20 wt. %, preferably 0.1 to 16 wt. %, based on the weight of the moulding composition.

The invention furthermore relates to shaped articles which have been produced partly or completely from the moulding compositions according to the invention. The moulding compositions can be employed for producing massive sheets of plastic and spaced sheets (e.g. multi-walled sheets). The sheets also include those which have an additional top layer with an increased UV absorber content on one side or both sides.

The polycarbonate moulding compositions according to the invention allow easier production of polycarbonate shaped articles, in particular sheets. The moulding compositions are suitable both for extrusion and for injection moulding. Sheets of various types of glazing for e.g. greenhouses, conservatories, bus shelters, advertising boards, signs, protective screens, automobile glazing, windows and roofing can be produced by extrusion.

Shaped articles such as all types of mouldings, in some cases with a complicated structure, such as housings, coil formers, coverings and domestic appliances, can be produced by injection moulding.

Subsequent working, such as thermoforming or working of the surface, such as treatment with scratch-resistant coatings, water-spreading layers and the like, is possible.

The invention is illustrated further by the following example.

EXAMPLE 10 mm double-walled sheets A, B, C, D and E, such as are described, for example, in EP-A 0 110 238, were obtained from the following moulding compositions: Makrolono® KU1-1243 (branched BPA-PC from Bayer AG Leverkusen with a melt flow index (MFR) of 6.5 g (10 min) at 300° C. under a 1.2 kg loading) was used as the base material.

This was coextruded with the compounds shown in the table which are based on Makrolon® 3100 (linear BPA-PC from Bayer AG, Leverkusen with an MFR of 6.5 g/(10 min) at 300° C. under a 1.2 kg loading). The thickness of the coextruded layer is about 50 μm in each case.

| Sheet | UV absorber | Mould release agent | Other additives |
|---|---|---|---|
| A | 5% Tin360 | 0.25% according to the invention*) | — |
| B | 5% Tin360 | 0.1% according to the invention*) | 0.05%*² |
| C | 5% Tin360 | 0.18% according to the invention*) | 0.05%*² |
| D | 5% Tin360 | 0.1%*¹ | 0.05%*² |
| E | 5% Tin360 | 0.25%*¹ | — |

*)commercially available, e.g. Hostalub ® WE 40 (product from Clariant GmbH, Frankfurt, Germany)
*¹pentaerythritol tetrastearate
*²glycerol monostearate Extruders for producing the core layer and top layer(s) were connected to a coextrusion adapter. The adapter was constructed such that the melt forming the top layer was applied as a thin layer adhering to the melt of the core layer.

The device comprised
the main extruder with a screw of length 33D and a diameter of 70 mm with degassing
the coextrusion adapter (feed block system)
a coextruder for applying the top layer with a screw of length 25D and a diameter of 30 mm
the specific slot die of 350 mm width
the calibrator
the roller conveyor
the take-off device
the length-cutting device (saw)
the stacking table.

The polycarbonate granules of the base material were fed to the hopper of the main extruder, and the UV coextrusion material was fed to that of the coextruder. Melting and conveying of the particular material took place in the particular cylinder/screw plasticizing system. The two material melts were fed together into the coextrusion adapter and, after leaving the die and cooling in the calibrator, formed a composite. The subsequent devices served for transportation, cutting to length and stacking of the extruded sheets.

The sheets of plastic coated on one side were coextruded continuously by the adapter process with the aid of the above devices. To prevent deformation of the still hot double-walled sheet strand, this was passed over a calibrator after leaving the die. Finally, it was cut to the given sheet length.

Coextrusion with E (reference):
first minor defects after 50 minutes (transverse waves)
larger defects after 90 minutes (warping of cross-pieces, white deposits, transverse waves)
rating: poor
Coextrusion with D (reference):
first minor defects after 90 minutes (small, white bubbles)
larger defects after 100 minutes (warping of cross-pieces, white deposits)
rating: satisfactory to poor
Coextrusion with A:
no deposits on the sheet over a test period of 5 hours
slight transverse waves occurring at irregular intervals after 110 minutes,
which do not adversely influence the sheet quality
rating: satisfactory
Coextrusion with B:
Very small, white deposits on the sheet after two hours, recurring in a half-hour rhythm.
These deposits adhere only poorly to the sheet and can easily be removed.
The sheet quality is not affected, above all because no transverse waves occur.
rating: good
Coextrusion with C:
Very small white deposits after two hours, recurring in a half-hour rhythm.
These deposits adhere only poorly to the sheet and can easily be removed.
the sheet quality is not affected, above all because no transverse waves occur.
rating: good

What is claimed is:

1. Polycarbonate moulding composition which comprises compounds of the general formula (I)

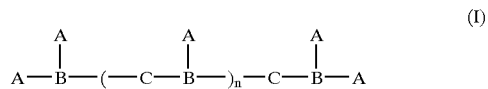

(I)

wherein A represents a $C_{10}$ to $C_{40}$-fatty acid radical, B represents a trivalent alcohol having 3 to 20 carbon atoms, C represents a dicarboxylic acid radical having 4 to 40 carbon atoms and n represents an integer from 0 to 15.

2. Polycarbonate moulding composition according to claim 1, characterized in that the concentration of the compound of the formula (I) in the polycarbonate moulding composition is 0.05 to 0.4 wt. %, based on the weight of the moulding composition.

3. Polycarbonate moulding composition according to claim 1, characterized in that the moulding composition additionally comprises 0.01 to 1 wt. % of a glycerol mono-fatty acid ester with a carboxylic acid radical having 10 to 26 carbon atoms.

4. Polycarbonate moulding composition according to claim 3, characterized in that the concentration of the glycerol mono-fatty acid ester is 0.02 to 0.3 wt. %, based on the weight of the moulding composition.

5. Polycarbonate moulding composition according to claim 1, characterized in that the moulding composition comprises 0.1 to 15 wt. %, based on the weight of the moulding composition, of UV absorber.

6. Polycarbonate moulding composition according to claim 5, characterized in that the UV absorber is 2-(4,6-diphenyl-1,3,5-triazin-2-yl)-5-(hexyl)oxyphenol.

7. Polycarbonate moulding composition according to claim 5, characterized in that the UV absorber is 2,2-methylenebis-(4-(1,1,3,3-tetramethylbutyl)-6-(2H-benzotriazol-2-yl)phenol).

8. Polycarbonate moulding composition according to claim 5, characterized in that the UV absorber is the compound of the formula (IV)

(IV)

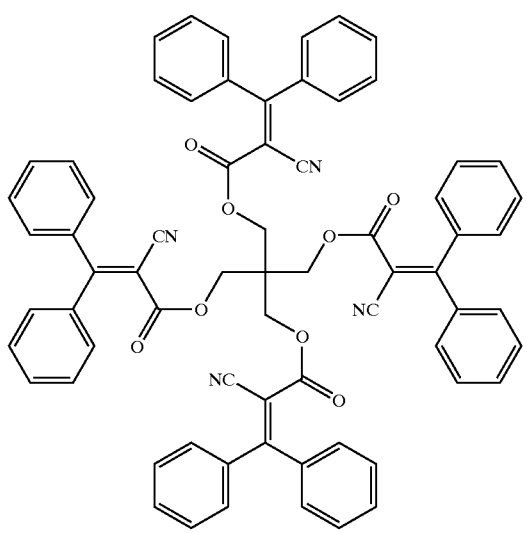

9. Polycarbonate moulding composition according to claim 1, characterized in that the moulding composition comprises 10 to 3,000 ppm of heat stabilizer(s).

10. Polycarbonate moulding composition, according to claim 9, characterized in that the heat stabilizer is tris-(2,4-di-tert.-butylphenyl)phosphite or triphenylphosphine.

11. The molding composition according to claim 1 wherein the compound of formula (I) is present in an amount of 0.02 to 1 wt. % relative to the weight of the molding composition.

12. A process for producing shaped articles comprising extruding the molding composition of claim 1.

13. A process for producing shaped articles comprising injection molding of the molding composition of claim 1.

14. The shaped article prepared by the process of claim 12.

15. The shaped article prepared by the process of claim 13.

16. A process for making a layered article comprising co-extruding the molding composition of claim 1.

\* \* \* \* \*